United States Patent [19]
Carsten

[11] Patent Number: 4,635,179
[45] Date of Patent: Jan. 6, 1987

[54] TRANSFORMER RECTIFIER

[75] Inventor: Bruce W. Carsten, West Vancouver, Canada

[73] Assignee: Eldec Corporation, Lynnwood, Wash.

[21] Appl. No.: 794,043

[22] Filed: Oct. 25, 1985

[51] Int. Cl.⁴ .............................................. H02M 7/08
[52] U.S. Cl. ..................................... 363/70; 363/126; 363/144
[58] Field of Search ....................... 363/67, 68, 69, 70, 363/126, 144, 145

[56] References Cited

U.S. PATENT DOCUMENTS

| | | | |
|---|---|---|---|
| 3,826,967 | 7/1974 | Wilkinson et al. | 363/126 |
| 3,906,336 | 9/1975 | De Puy | 363/126 |
| 4,317,040 | 2/1982 | Wuerflein | 363/95 |

*Primary Examiner*—Peter S. Wong
*Assistant Examiner*—Jeffrey Starratt
*Attorney, Agent, or Firm*—Fetherstonhaugh & Co.

[57] ABSTRACT

A physically integrated assembly of tow magnetically independent transformers and two semiconductor rectifiers, arranged to minimized leakage and parasitic lead inductances, and the resultant voltage dropout during current commutation from one transformer-rectifier to the other. In a suitable circuit this assembly produces a nearly pure DC output voltage, which requires a minimum amount of filtering. It is also possible, when a choke input filter is required in the output, to integrate the filter choke into the same physical assembly, using part of the existing tranformer core material. The choke is magnetically independent of the transformers.

18 Claims, 8 Drawing Figures

TRANSFORMER RECTIFIER

This invention relates to the production of low DC voltages by the use of high frequency power conversion techniques in a power supply of minimum volume, and more particularly, to a transformer-rectifier assembly for producing low DC voltages.

Background of the Invention

The push to ever denser, faster and more complex integrated circuits mandates the eventual use of supply voltages below the present 5 volt standard. A new standard of 3.3 volt has recently been approved. This standard was established to allow interface capability with 5 volt logic circuits despite pressure to standardize on a lower voltage. However, the laws of physics will soon force the use of lower power supply voltages. For example, 2 volt supplies are finding increasing use, and voltages down to 1 and 0.5 volts are expected to become common in the highest performance systems of the future.

Power supplies with low output voltages (0.5 to 3 volts) face two major design difficulties. First, low efficiency due to the output rectifier forward voltage drop, and second, the relatively large output filter which inhibits compact designs.

It has been suggested that low voltage logic systems of any size will have to have a plurality of power sources distributed among the power consuming circuitry to maintain acceptable power distribution losses. This in turn requires that low voltage power supplies be as efficient and compact as possible to prevent serious compromises in the overall performance of the logic system.

Conventional switchmode design techniques require the impedance of output filter capacitors to be scaled proportional to the load impedance, which is proportional to the square of the output voltage for a given power output. However, at frequencies above twenty kilohertz and with present state of the art plastic, ceramic and electrolytic capacitors, the impedance per unit volume of a capacitor does not decrease significantly with voltage requirements below about fifty volts. Thus, the relative volume of the output filter capacitor tends to increase rapidly as the output voltage is lowered, and eventually becomes the dominant and limiting volume at very low output voltages and high power conversion frequencies.

Another problem associated with prior art transformers is that the rate of current commutation is limited by the leakage inductance of the power transformers, rectifier package inductance, and the interconnect wiring and termination inductances.

SUMMARY OF THE INVENTION

One approach to reducing output capacitor volume is to minimize the output filtering required. The output filtering requirements can be reduced by utilizing a physically integrated assembly of two magnetically independent transformers and two semiconductor rectifiers, arranged to minimize leakage and parasitic lead inductances, and the resultant voltage dropout during current commutation from one transformer-rectifier to the other. It is therefore an object of the present invention to provide a transformer rectifier assembly which eliminates the problems associated with prior art devices and will produce a rectified output of nearly pure DC voltage before filtering by minimizing the time required for current commutation between output rectifiers. Another object of the present invention is to provide a transformer rectifier assembly which minimizes leakage inductances by the physical integration of output transformers and rectifiers into a single assembly.

Accordingly, there is provided an integrated transformer-rectifier assembly comprising first and second closed-loop cores of magnetic material, each core having a first portion provided with a primary winding, said primary windings being closely spaced apart and closely encircled throughout their entire length by a single turn secondary winding, said secondary winding having closely spaced ends on one side of said cores which are connected via rectifiers to a first output lead, a second output lead being connected to said secondary winding on the other side of said cores.

These and other features and advantages of this invention will become apparent from the detailed description below. That description is to be read in conjunction with the accompanying drawings, in which.

DETAILED DESCRIPTION

Figure 1:
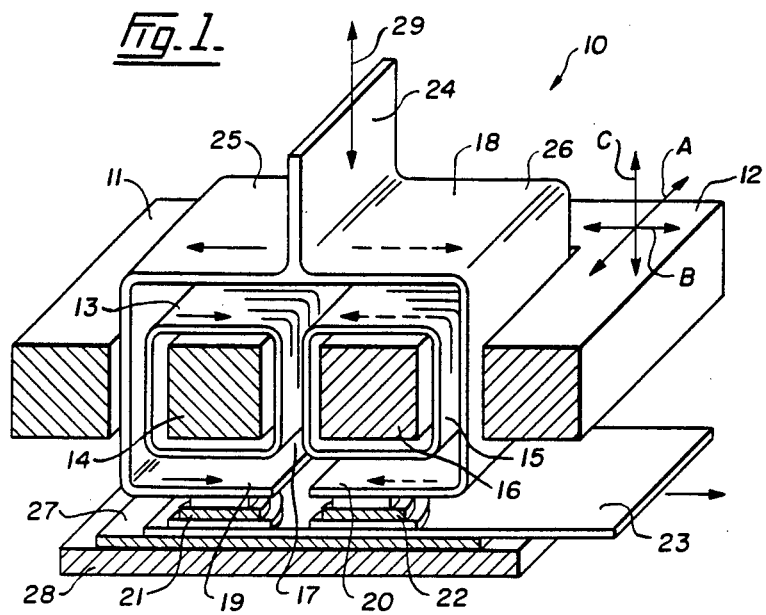
FIG. 1 is a diagrammatic view of the construction of an embodiment of the transformer-rectifier assembly in accordance with the invention.
Figure 2:
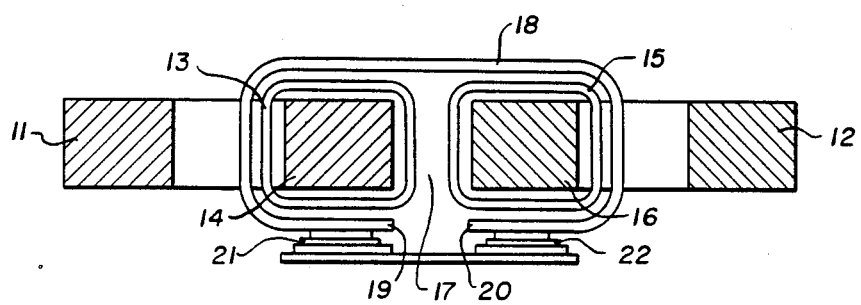
FIG. 2 is a sectional view of the transformer-rectifier assembly of FIG. 1.

Referring now to FIGS. 1 and 2 reference numeral 10 shows one embodiment of the transformer-rectifier assembly according to the present invention. The transformer-rectifier assembly is comprised of a first closed-loop ferromagnetic core 11 and a second closed-loop ferromagnetic core 12. These ferromagnetic cores can be of a rectangular shape with a square or rectangular cross-section and can be made of a suitable magnetic material.

A first primary winding 13 is wound around one leg 14 of the first ferromagnetic core 11. A second primary winding 15 is wound around one leg 16 of the second ferromagnetic core 12. The first ferromagnetic core 11 is placed adjacent to the second magnetic core 12 in a co-planar arrangement such that the primary windings 13 and 15 are in near contact as is shown at 17. A single turn secondary winding 18 is wound closely around the first primary winding 13 and second primary winding 15. This physical arrangement form two magnetically independent transformers.

The secondary winding 18 can be made of a uniform sheet of conducting material, such as a metal foil, having closely spaced ends 19 and 20. The secondary winding 18 can also be made of a plurality of parallel conductors placed adjacent each other and wound around the primary windings 13 and 15. The ends 19 and 20 of the secondary winding 18 are connected via semiconductor rectifiers 21 and 22 to a conductive sheet 23 which is used as an output line of the secondary winding 18. The semiconductor rectifiers 21 and 22 can be rectifier pellets, which are an intermediate stage of fabrication between chips and fully packaged devices. The other output feeding line of the secondary winding 18 is shown at 24. This line 24 is positioned on an axis 29 perpendicular to the longitudinal and lateral axes, (A) and (B) respectively, of the ferromagnetic cores 11 and 12. The orientation of the feeding line 24, shown in FIG. 1, is positioned in a perpendicular orientation for the purpose of clarity, other positions will be readily apparent to those knowledgeable in this art. The output feeding line 24 is centrally located on the secondary winding 18 in such a position that the output current is forced to flow through alternate halves of the secondary winding by the primary currents. For example, when the primary winding 13 is energized, current will flow in one-half of the secondary winding 25 to connecting end 19, through rectifier 21 and then to the output line 23. However, when the second primary winding 15 is energized, current will flow from the input feeding line 24 to the second half 26 of secondary winding 18 to connecting end 20, through rectifier 22 and then to output line 23. The secondary winding is not in fact a centre-tapped single turn winding, (with one-half turn on each core) as it might appear, but rather functions as a complete turn around each transformer core 11 and 12. The input lines of the first and second primary windings 13 and 15, respectively, are not shown in FIG. 1 for clarity. The transformer-rectifier assembly 10 can be positioned in a circuit, over an insulator 27 and further positioned over a heat sink 28 for heat dissipation.

As can be seen by referring to FIG. 2, rectifiers 21 and 22 are positioned directly beneath the first and second primary windings, 13 and 15 respectively, and connected between the first and second connecting ends, 19 and 20 respectively, of the secondary winding 18.

Figure 3:
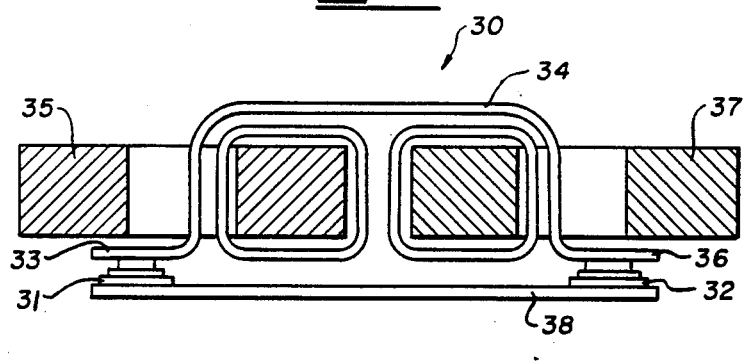
FIG. 3 is a sectional view of another embodiment of a transformer-rectifier assembly according to the invention.

Reference numeral 30 in FIG. 3, shows another embodiment of the transformer-rectifier assembly. However, in FIG. 3, the first connecting end 33 of the secondary winding 34 is positioned beneath an uncovered section of the first magnetic core 35. The second connecting end 36 is positioned underneath the uncovered or unshielded section of the second magnetic core 37. The first and second connecting ends 33 and 36, respectively, are electrically connected to a rectifier common connection 38 via rectifiers 31 and 32, respectively. This alternative rectifier arrangement provides a compact transformer-rectifier assembly of minimum height.

Figure 4:
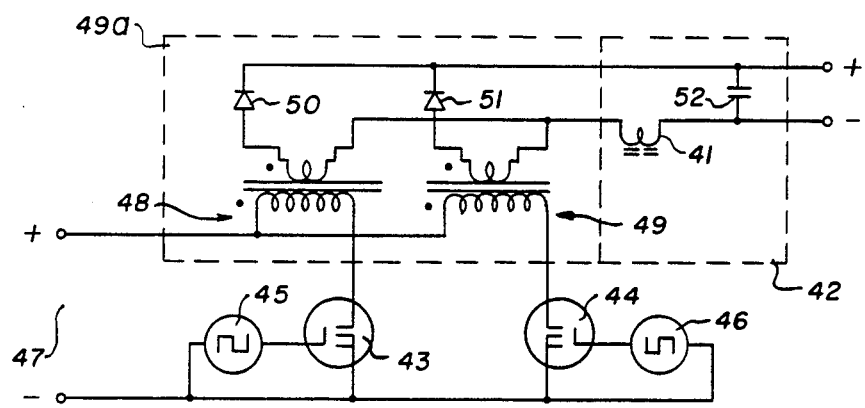
FIG. 4 is a schematic diagram of a power supply circuit using a transformer-rectifier assembly according to the present invention.
Figure 5:
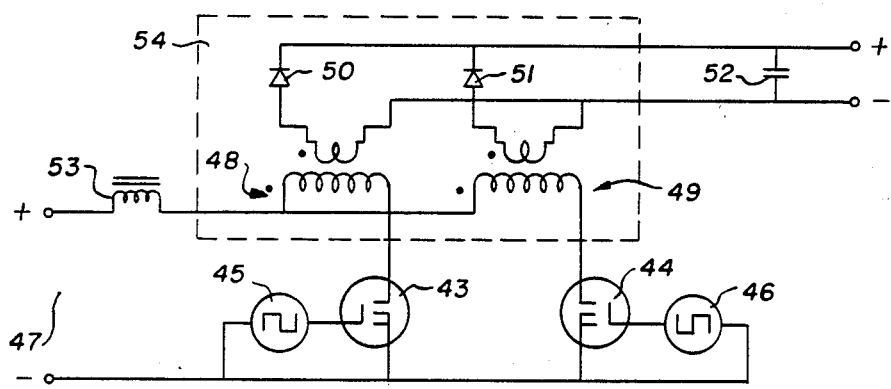
FIG. 5 is a schematic diagram of an alternative power supply circuit using a transformer-rectifier assembly according to the present invention.

The previously described transformer-rectifier assemblies can typically be used in d.c. power supply circuits such as shown in FIGS. 4 and 5. The circuit of FIG. 4 is a voltage fed transformer circuit which uses a choke input 41 for the output filter 42. The two transistor switches 43 and 44 are driven out of phase by control and drive circuits 45 and 46, respectively. The transistors 43 and 44 may be driven with slight to moderate conduction overlap; that is: transistors 43 and 44 may both be on for a fraction of the switching period. When transistor 43 is on (conducting) and transistor 44 is off, the input voltage 47 is transformed down by the turns ratio of transformer 48 in the transformer-rectifier assembly 49. Transistor 44 is turned on before transistor 43 is turned off, but there is no significant change in the current flow in transformer 48 and transformer 49 until transistor 43 is turned off, at which time the current is commutated from transformer 48 and rectifier 50 to transformer 49 and rectifier 51 at a rate essentially limited by the total inductance in the circuit comprised of rectifiers 50, 51, and the leakage inductance of the transformer secondary. This total inductance is physically defined by the space between the first and second primary windings, and the space between the primary windings and the secondary winding. During commutation the voltage at the rectifier output will be approximately zero. This short voltage dropout is filtered by inductor 41 and capacitor 52. A similar commutation occurs from transformer 49 and rectifier 51 to transformer 48 and rectifier 50 when transistor 43 turns on and transistor 44 turns off.

The circuit of FIG. 4 does not regulate the output voltage, but only transforms the input voltage 47 by a fixed ratio dependent on the transformer turns ratio and the switch and diode voltage drops. When output voltage regulation is required, the input voltage 47 may be pre-regulated by any conventional means to regulate or control the output voltage.

The circuit of FIG. 5 is similar to that of FIG. 4 except that the filter inductor 41 shown in FIG. 4 has been "transformed" to the primary side 53 to form a "current fed" transformer circuit 54; operation is otherwise similar. Logic circuits, transistor switch drive circuits, and transformer magnetizing current reset circuits are not shown in FIGS. 4 and 5 for simplicity. These can easily be implemented by someone knowledgeable in the art.

Figure 6:
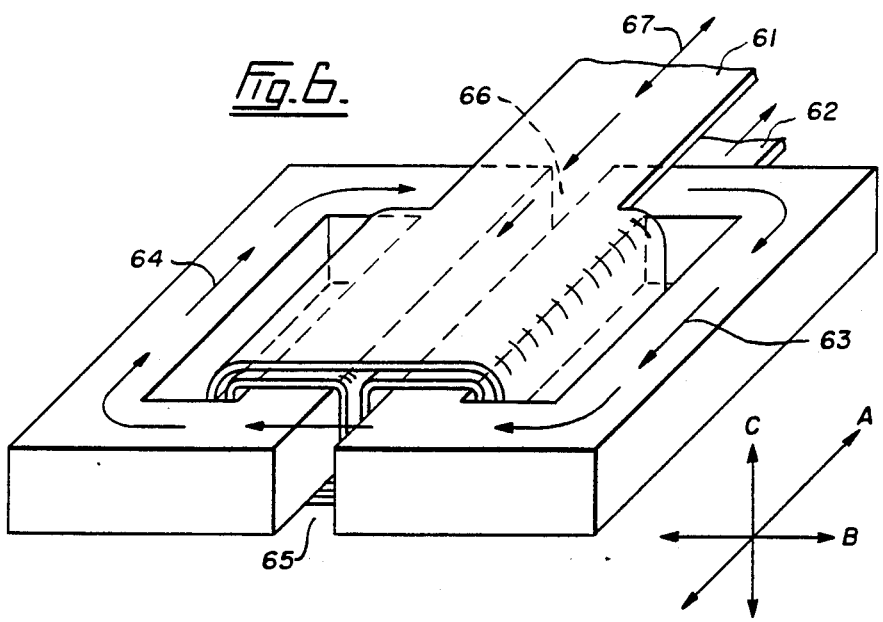
FIG. 6 is a simplified diagrammatic view of an embodiment of the invention which includes an output inductance (choke)

When the current feeding line connections are made to the transformer-rectifier assembly, such as is shown at 23 and 24 of FIGS. 1 and 2, and 61 and 62 of FIG. 6, an output inductor is automatically formed by the transformer core sections not covered (or shielded) by the primary windings (the outside and end sections of the cores) and the single turn of conductor (input lead, paralleled secondaries and rectifiers, and output lead) through this core. The structure of this choke is shown in FIG. 6. The magnetic field of the choke flows around the outside legs 63 and 64 of the transformers only, and does not interact significantly with the transformer magnetic fields. This magnetic structure has two air gaps 65 and 66. In practice it may be desirable to fill one of these gaps with magnetic material; this will not affect operation of the transformers or induce significant coupling between the magnetic structures (two transformers and one choke). This output connection arrangement is best suited to voltage fed circuits typified by FIG. 4, where this built-in choke can serve as some or all of the required output filter inductance. This choke is magnetically independent of the transformers. As shown in FIG. 6, conducting lines 61 and 62 enclose air gap 66 such that the feeding lines 61 and 62 are positioned in planes defined by the longitudinal axis (A) and the lateral axis (B) of the ferromagnetic cores.

Figure 7:
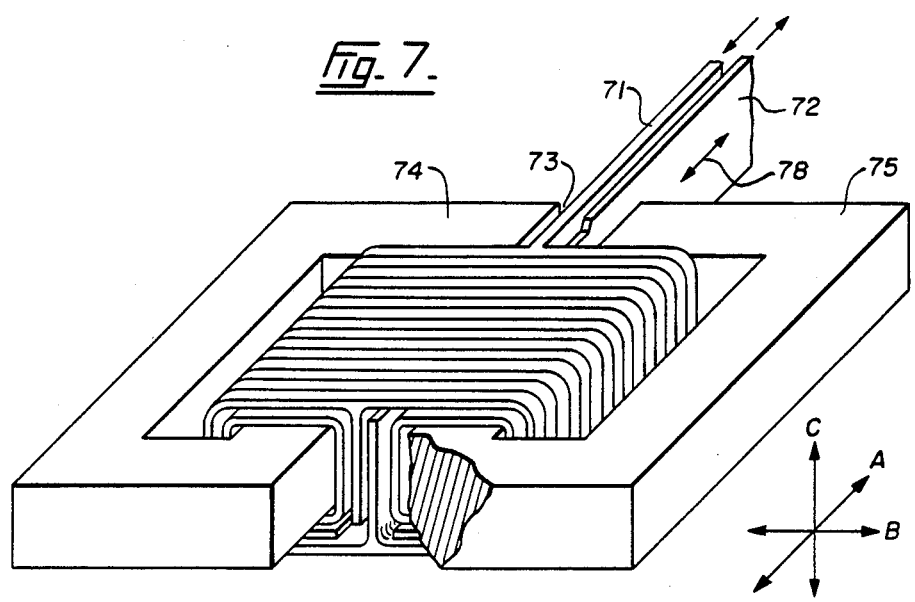
FIG. 7 is a diagrammatic view of another embodiment of the invention which does not have an output inductance.
Figure 8:
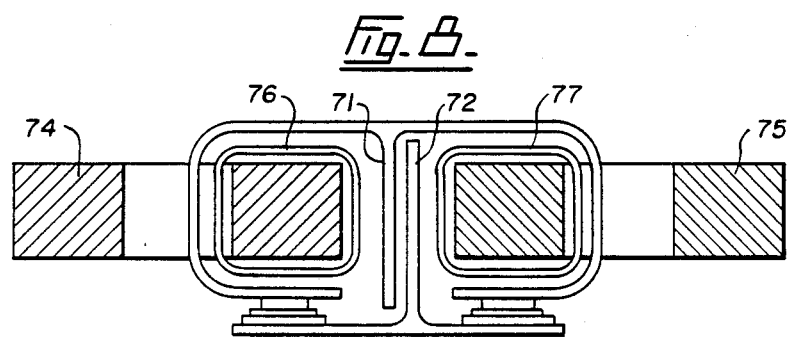
FIG. 8 is a sectional view of the output connection arrangement of FIG. 7.

If a current fed circuit such as is shown in FIG. 5 is to be used, this built-in inductance is detrimental and undesirable. This now undesirable output inductance can be removed by the use of output connections such as shown in FIG. 7. The feeding lines 71 and 72 shown in FIGS. 7 and 8 are positioned so as to go through the air gap 73 which prevents the output current from inducing a magnetic field in the cores 74 and 75. As can be seen in FIG. 7 and the sectional view shown in FIG. 8, the feeding lines 71 and 72 are closely positioned parallel to each other and between primary windings 76 and 77 in planes defined by the longitudinal axis (A) and vertical axis (C) of the ferromagnetic cores such that no magnetic field is induced in the cores 74 and 75. In the arrangements of FIGS. 6 and 7, the current in the secondary is also fed at the centre of the secondary winding such that it is forced to flow through alternate halves of the secondary winding by the primary currents as is discussed above.

The embodiments of the invention in which an exclusive property or privilege is claimed are defined as follows:

1. An integrated transformer-rectifier assembly comprising first and second closed-loop cores of magnetic material, each core having a first portion provided with a primary winding, said primary windings being closely spaced apart and closely encircled throughout their entire length by a single turn secondary winding, said secondary winding having closely spaced ends on one side of said cores which are connected via rectifiers to a first output lead, a second output lead being connected to said secondary winding on the other side of said cores.

2. A transformer-rectifier assembly comprising a first closed-loop ferromagnetic core, a first primary winding wound on one leg of said first ferromagnetic core, a second closed-loop ferromagnetic core and a second primary winding wound on one leg of said second ferromagnetic core, wherein said first and second ferromagnetic cores are placed adjacent each other with said first and second primary windings in near contact;

a single-turn secondary winding closely wound around said first and second primary windings, to form a first and second transformer, said secondary winding being electrically connected to a common connection via rectifiers such that inductances in said assembly are minimized by the resulting integration of said transformer and rectifiers into a single assembly.

3. A transformer-rectifier assembly as defined in claims 1 or 2 wherein said first and second cores are rectangular shaped magnetic cores.

4. A transformer-rectifier assembly as defined in claims 1 or 2 wherein said rectifiers are semiconductor rectifiers.

5. A transformer-rectifier assembly as defined in claims 1 or 2 wherein said cores are positioned in a co-planar arrangement.

6. A transformer-rectifier assembly as defined in claims 1 or 2 wherein said secondary winding is comprised of a single uniform sheet of conducting material wound once around said primary windings.

7. A transformer-rectifier assembly as defined in claims 1 or 2 wherein said secondary winding is comprised of a plurality of parallel conductors placed adjacent each other and wound around said primary windings.

8. A transformer-rectifier assembly as defined in claims 1 or 2 wherein said cores have a square cross-section.

9. A transformer-rectifier assembly as defined in claim 2 wherein said rectifiers are positioned beneath uncovered sections of said first and second ferromagnetic cores between said secondary winding and said common connection.

10. A transformer-rectifier assembly as defined in claim 2 wherein said rectifiers are positioned beneath said first and second primary windings between said secondary winding and said common connection.

11. A transformer-rectifier assembly as defined in claims 2 or 10 wherein said rectifiers consist of a first and second rectifier, said first rectifier being positioned beneath said first primary winding between said secondary winding and said common connection and said second rectifier being positioned beneath said second primary winding between said secondary winding and said common connection.

12. A transformer-rectifier assembly as defined in claim 2 wherein said secondary winding is further comprised of first and second electrical connecting ends such that said first connecting end lies beneath said first primary winding and said second connecting end lies beneath said second primary winding.

13. A transformer-rectifier assembly as defined in claim 2 wherein current is centrally fed to said secondary winding such that an output current is forced to flow through alternate halves of said secondary winding to said rectifiers wherein a first half of said secondary winding is wound around said first primary winding and a second half of said secondary winding is wound around said second primary winding to form a first and a second transformer respectively, wherein said first and second transformers are magnetically independent such that when said first primary winding is energized, current will flow in said first half of said secondary winding and alternately when said second primary winding is energized, current will flow in said second half of said secondary winding.

14. A transformer-rectifier assembly as defined in claim 13 wherein said current is centrally fed to said secondary winding through feeding lines positioned in planes defined by the lateral and longitudinal axes of said ferromagnetic cores.

15. A transformer-rectifier assembly as defined in claim 13 wherein said current is centrally fed to said secondary winding through feed lines positioned in planes defined by the longitudinal and vertical axes of said ferromagnetic cores.

16. A transformer-rectifier assembly as defined in claim 15 wherein said current feeding lines of said secondary winding are positioned so as to enclose an air gap created by said first and second ferromagnetic cores such that an output inductor is formed by an unshielded section of said first and second ferromagnetic cores.

17. A transformer-rectifier assembly as defined in claim 13 wherein said current feeding lines of said secondary windings are positioned within an air gap created by said first and second ferromagnetic cores such that output inductances of said transformer-rectifier assembly is cancelled.

18. A transformer-rectifier assembly as defined in claim 17 wherein said current feeding lines of said secondary windings are positioned parallel to each other within said air gap and in planes defined by the longitudinal and vertical axis of said ferromagnetic cores.

* * * * *